July 31, 1962    J. E. BRIDEGUM    3,046,722
GARDEN SHEARS
Filed Oct. 10, 1960
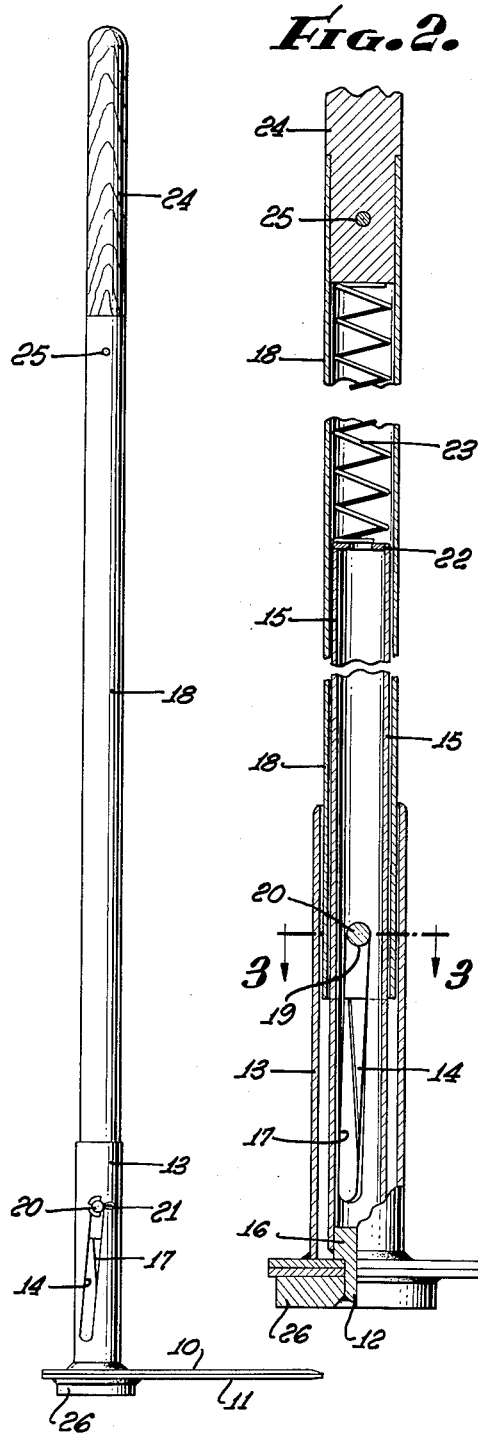
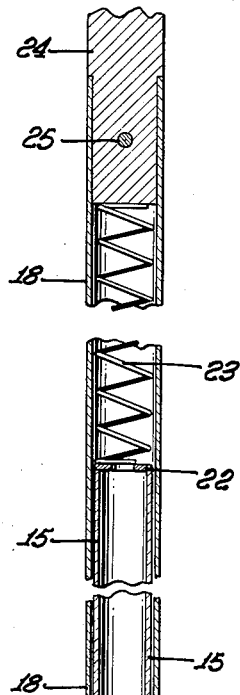
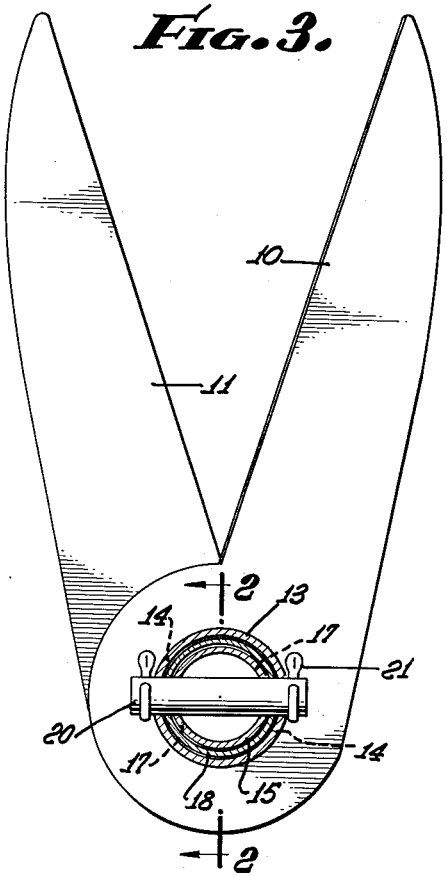
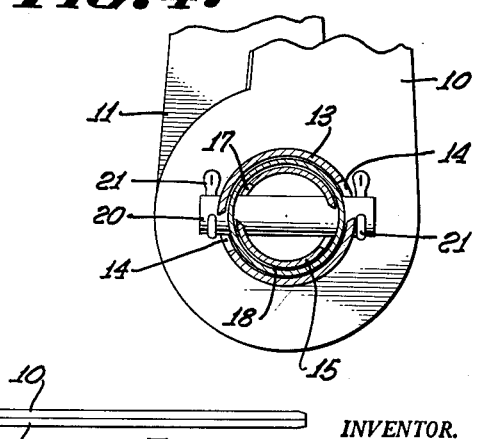
INVENTOR.
JAMES E. BRIDEGUM
BY
AGENT.

United States Patent Office 3,046,722
Patented July 31, 1962

3,046,722
GARDEN SHEARS
James E. Bridegum, 419 Reed St., Covina, Calif.
Filed Oct. 10, 1960, Ser. No. 61,684
1 Claim. (Cl. 56—241)

This invention relates to shears for trimming lawn grass and other growths which gardeners desire to clip closely to the ground.

Many forms of hand shears are employed for trimming the edges of lawns and other places not accessible to a lawn mower. But these are fatiguing to use because they must be operated from a kneeling or sitting position and also because they are actuated by gripping motion of the fingers rather than by the stronger muscles of the arms and shoulders. And there are numerous devices, essentially modified lawn mowers, which are designed for clipping edges of lawns. These are successful when the edges are unencumbered and fairly straight, but they are awkward for use on irregular edges or under overhanging branches of shrubbery.

An object of my invention is to provide garden shears capable of being used by a man in upright position.

Another object of my invention is to provide garden shears actuated by vertical reciprocating motion of a single handle.

Further objects and advantages of my invention will be apparent from the following description and from the accompanying drawing, in which:

FIG. 1 is a view in elevation indicating the structure and proportions of the complete device;

FIG. 2 is a larger-scale view in longitudinal section on the line 2—2 of FIG. 3, depicting portions of the device;

FIG. 3 is a cross section on the line 3—3 of FIG. 2, the scale being further enlarged; and FIG. 4 is a fragmentary cross section on the same scale and plane as in FIG. 3, showing the position taken by parts when the blades of the shears are closed.

Referring to the drawing, the shears have an upper blade 10 and a lower blade 11, both drilled to receive pivot 12. Outer tube 13, which is provided with two opposite, helical slots 14—14, is welded to the upper surface of upper blade 10, coaxially with the pivot. Slots 14—14 are turned as the threads of a right-handed screw, but with much elongated pitch. In a preferred embodiment of the device, the slots are about four inches long and turn through about 15 degrees.

Inner tube 15 is fitted over enlarged head 16 of pivot 12 and welded to it. This tube is provided with slots 17—17 which are like slots 14—14 except that they are turned as the threads of a left-handed screw.

Intermediate tube 18 is drilled with two opposite holes, one of which is at 19 in FIG. 2, near its lower end. In the assembled device the lower portion of tube 18 fits in the annulus between tubes 13 and 15, and transverse pin 20 passes through holes 19, slots 14—14, and slots 17—17. The pin is held in place by cotter pins 21—21.

Washer 22 rests on the top of inner tube 15 and provides the bearing surface for the lower end of spring 23 which fits within the upper portion of tube 18. The upper end of the spring bears against the lower end of handle 24 (preferably of hardwood) which is affixed at the end of tube 18 by rivet 25.

Foot 26 is a short cylindric part, centrally drilled to receive the lower end of pivot 12. The foot is welded to the lower surface of lower blade 11 with its hole matching the hole in the blade. The device being fully assembled, the blades are turned so that they are in closed position when pin 20 is at the bottom of slots 14—14 and 17—17, and foot 26 is then welded to pivot 12.

In operation the shears are placed so that the handle is vertical and foot 26 rests on the ground, with the herbage to be cut between the open blades. Then the handle is pushed downward, acting through tube 18 to force pin 20 toward the lower ends of slots 14—14 and 17—17. The sides of the slots function as cam surfaces to turn tubes 13 and 15 in opposite directions and thereby to close the blades of the shears, bringing the parts into the positions shown in FIG. 4. The cutting stroke having been accomplished, the operator permits handle 24 to rise to its upper limit of travel, restoring the parts to the positions shown in FIGS. 1, 2, and 3.

I claim as my invention:

Garden shears comprising: an upper blade; a lower blade; a pivot constraining said blades to angular motion with respect to one another, said pivot being affixed to said lower blade and having an enlarged head arranged so that the lower surface of said head bears against the upper surface of said upper blade; a foot beneath said lower blade adjacent said pivot; an upwardly extending outer tube affixed to said upper blade coaxially with said pivot, said outer tube being provided with two opposite, essentially helical slots; an upwardly extending inner tube affixed to the head of said pivot coaxially therewith, said inner tube being provided with two opposite, essentially helical slots of pitch opposite to that of the slots in said outer tube; an intermediate tube fitting in the annulus between said inner tube and said outer tube, said intermediate tube being provided with two opposite holes; a transverse pin passing through said holes and all of said slots; a handle affixed to said intermediate tube, and a helical spring within said intermediate tube, its lower end bearing against the upper end of said inner tube, whereby said blades move horizontally toward one another when said handle is pressed downwardly and move away from one another when said handle is released.

References Cited in the file of this patent
UNITED STATES PATENTS

| | | |
|---|---|---|
| 798,307 | Taylor | Aug. 29, 1905 |
| 1,799,087 | Carpenter | Mar. 31, 1931 |
| 2,519,176 | Caves | Aug. 15, 1950 |